(12) United States Patent
Chen

(10) Patent No.: US 8,598,474 B2
(45) Date of Patent: Dec. 3, 2013

(54) KEY ASSEMBLY

(75) Inventor: Chao Chen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 807 days.

(21) Appl. No.: 12/635,989

(22) Filed: Dec. 11, 2009

(65) Prior Publication Data

US 2011/0140932 A1    Jun. 16, 2011

(51) Int. Cl.
*H01H 9/00* (2006.01)

(52) U.S. Cl.
USPC .......................................................... 200/1 B

(58) Field of Classification Search
USPC .............. 200/1 B, 510, 520, 512, 303, 302.2; 361/625, 652, 679.01
See application file for complete search history.

(56) References Cited

U.S. PATENT DOCUMENTS

| | | | | |
|---|---|---|---|---|
| 5,746,307 A | * | 5/1998 | Joss et al. | 200/303 |
| 6,100,484 A | * | 8/2000 | Houze et al. | 200/512 |
| 6,148,183 A | * | 11/2000 | Higdon et al. | 455/575.1 |
| 6,791,533 B2 | | 9/2004 | Su | |
| 2004/0240162 A1 | | 12/2004 | Hsu | |
| 2005/0272491 A1 | | 12/2005 | Jeon | |
| 2006/0243267 A1 | | 11/2006 | Nakajima | |
| 2007/0034493 A1 | | 2/2007 | Kawasaki | |
| 2007/0046646 A1 | | 3/2007 | Kwon | |

OTHER PUBLICATIONS

First impressions of the T-Mobile Blackberry Curve 8900 with high res, GPS, and updated keyboard; http://blogs.zdnet.com/cell-phones/?p=496; retrieved on Dec. 11, 2009.
HTC Touch Pro Review: black diamond with a keyboard; http://www.product-reviews.net/2008/06/05/htc-touch-pro-review-black-diamond-with-a-keyboard/ retrieved on Dec. 11, 2009.
HTC Touch Pro pictures; http://www.gsmarena.com/htc_touch_pro-pictures-2413.php; retrieved on Dec. 11, 2009.
Extended European Search report dated Jul. 26, 2010. In corresponding application No. 09178952.9.

* cited by examiner

*Primary Examiner* — Vanessa Girardi
(74) *Attorney, Agent, or Firm* — Fitch, Even, Tabin & Flannery LLP

(57) ABSTRACT

A mobile device is described herein in which the mobile device has a housing that includes a transition point and an actuator that can be flexible and that can be used to initiate a predetermined action. The actuator can include a transition point. The mobile device can also have a stiffening component that can be configured to engage the actuator and can also have a flexible circuit. In one arrangement, the flexible circuit can be coupled to the stiffening component and the flexible circuit can be configured to relay signals in response to a force being applied to the actuator. In another arrangement, the actuator can be positioned such that the transition point of the actuator substantially aligns with the transition point of the housing of the mobile device.

14 Claims, 19 Drawing Sheets

KEY ASSEMBLY

FIELD OF TECHNOLOGY

The subject matter herein generally relates to key assemblies and in particular, to key assemblies in mobile devices.

BACKGROUND

Handset manufacturers constantly strive for aesthetically pleasing designs of their models. As an example, it is desirable with some mobile devices to eliminate components that protrude from the main body or to at least reduce their profile. Many handset designers also strive to eliminate joints or lines where pieces of a mobile device meet, such as a battery cover and the back of the main housing. This goal can be difficult to meet given all the features and user interface controls packed into mobile units. For example, discrete volume buttons or other dedicated controls on the side of a mobile device typically extend beyond the housing of the device, which makes the device appear bulky and disjointed. Moreover, these components create additional unwanted lines in the overall outside appearance of the mobile device. This problem is exacerbated in slide-style mobile devices, or handsets where a user can gain access to a major portion of the phone (such as a keypad) by sliding a part of the housing in a certain direction.

In an effort to overcome these obstacles, some designers have implemented flush-mounted components on the surfaces of mobile devices. Even so, the unsightly joints described above remain in place, and it is difficult to incorporate these flush-mounted units in view of the limited amount of space that is available inside a mobile device.

BRIEF DESCRIPTION OF THE DRAWINGS

Embodiments of the present application will now be described, by way of example only, with reference to the attached Figures, wherein.

DETAILED DESCRIPTION

Figure 1:
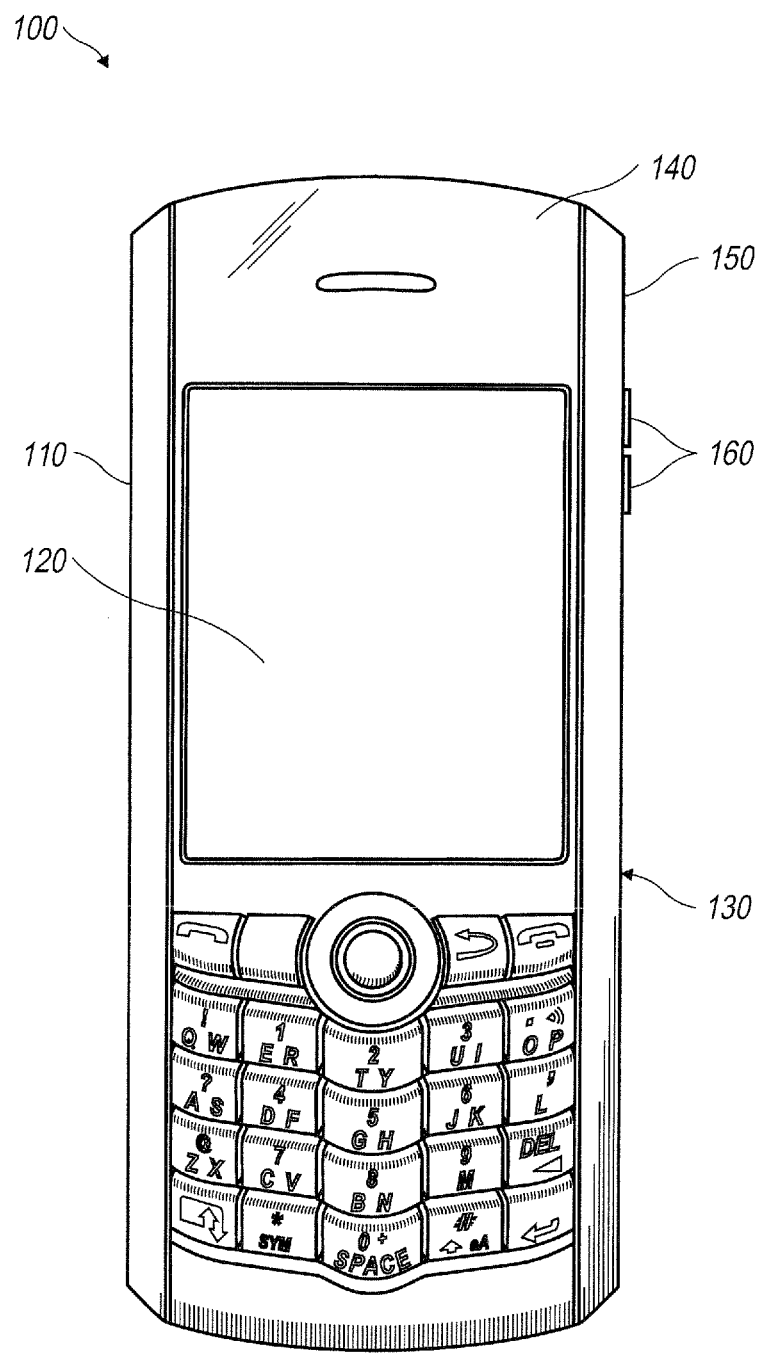
FIG. 1 illustrates an example of a mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Several definitions that apply throughout this document will now be presented. The word "coupled" is defined as connected, whether directly or indirectly through intervening components and is not necessarily limited to physical connections. The term "mobile device" is defined as any electronic device that is capable of at least accepting information entries or commands from a user and includes its own power source. The term "housing" is defined as a unit that provides support and protection for one or more components that make up a mobile device. The term "transition point" is defined as a discernable break or interruption in the shape, planarity, angle or arc of a surface. A "gap" means a separation between two or more components and can be formed at the juncture of two or more transition points. The terms "substantially aligns" and "substantially aligned" are defined as a condition in which two or more opposing lines, edges or gaps are positioned substantially parallel to one another.

The term "switch" is defined as a component that assumes two or more states and transitions between the states in response to an applied signal or force. Also, an "actuator" is defined as any component or group of components that initiate a predetermined action on the part of another component in response to the receipt of an external force. The term "stiffening component" means any component or group of components that provides support to a flexible material or component. The term "cushioning element" is defined as any component or group of components that deform when a force is applied to it and substantially returns to its original shape when the force is removed. A "flexible circuit" is defined as a substrate that includes one or more traces for relaying or transmitting signals and that can be manipulated to twist or bend around other components.

As noted earlier, it is desirable to eliminate unsightly lines or seams on the outer surfaces of mobile devices and to reduce the profile of buttons or other actuators on these units. Designers, however, face numerous obstacles in achieving these objectives due to limited spacing in these devices and the many features packed into them, particularly for slide-style handsets. A mobile device in combination with a key assembly that overcomes these disadvantages is presented herein.

In one arrangement, the mobile device can include a housing that has a transition point and an actuator that can be flexible and that can be used to initiate a predetermined action. The actuator can also include a transition point. The mobile device can further have a stiffening component that can be configured to engage the actuator and can have a flexible circuit that can be coupled to the stiffening component. Additionally, the flexible circuit can be configured to relay signals in response to a force being applied to the actuator. The actuator can be positioned such that the transition point of the actuator substantially aligns with the transition point of the housing of the mobile device. In view of this alignment and the configuration of the components mentioned above, the mobile device can have a reduced number of seams and can receive actuators or controls having a profile that is substantially flush with the housing.

Referring to FIG. 1, an example of a mobile device 100 is shown. In one arrangement, the mobile device 100 can include a housing 110, a display 120 and a keypad 130. The keypad 130 can include a keyfield having alphanumeric keys arranged in a keyboard layout, numeric keys, and other function keys. It is understood, however, that the keypad 130 can alternatively be a touch keypad that can be shown on the display 120 for touch-screen entry. The mobile device 100 can include a front surface 140 and a side surface 150 in which the side surface 150 can be substantially perpendicular to the front surface 140. As can be seen in this example, the front surface 140 can include the display 120 and the keypad 130, although these components may be positioned on other surfaces of the mobile device 100, if so desired. One or more actuators 160, such as depressible buttons, can be positioned on the side surface 150 for initiating a predetermined response on the mobile device 100. Of course, one or more actuators 160 may also be positioned on the front surface 140. While in the illustrated embodiment the mobile device 100 is a handheld wireless communication device, the mobile device 100 can be any of the following: a personal digital assistant (PDA), a handheld electronic device, a non-handheld wireless communication device, a pager, a cellular phone, a cellular smart-phone, a wireless organizer, a wirelessly enabled notebook computer and the like.

Figure 2:
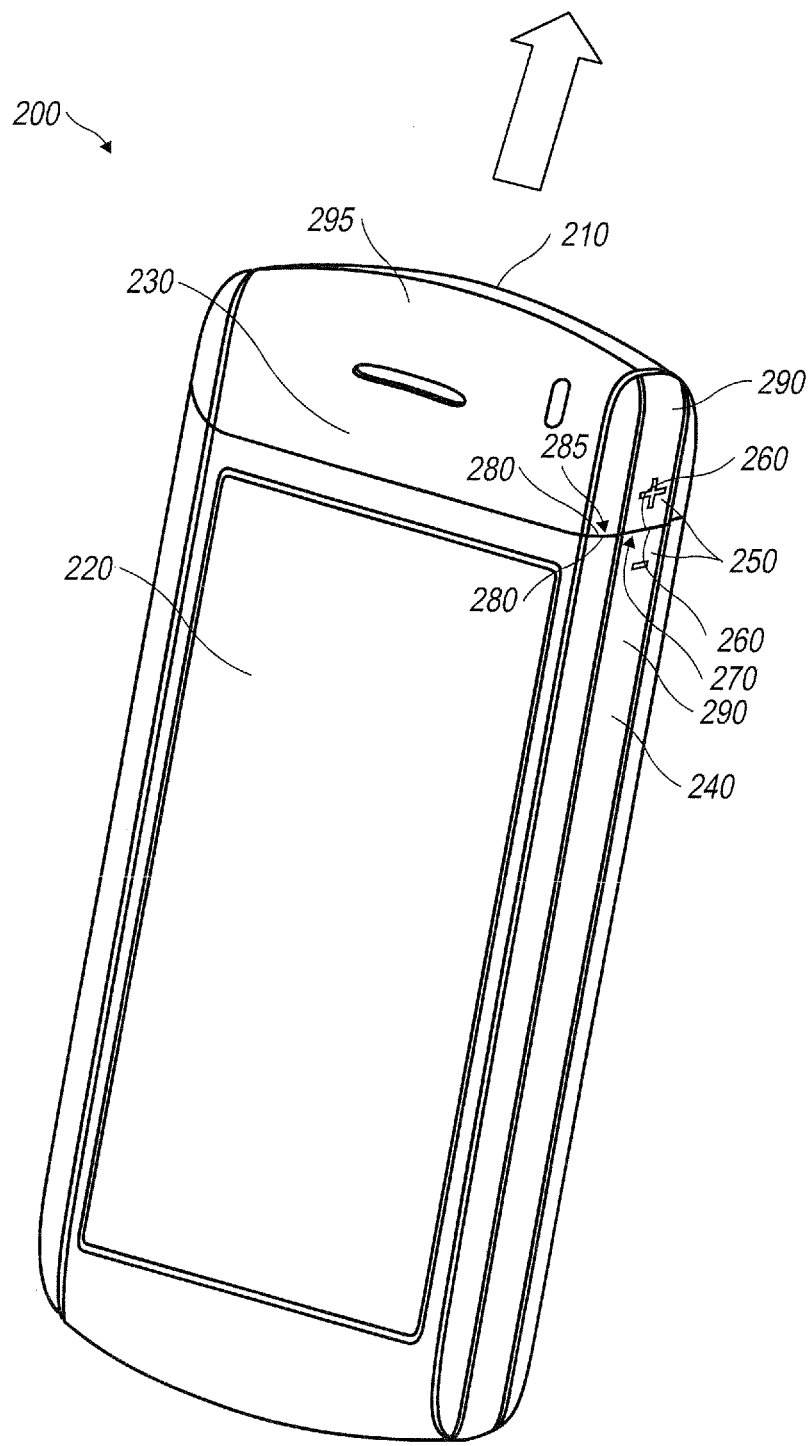
FIG. 2 illustrates another example of a portion of a mobile device.
Figure 3:
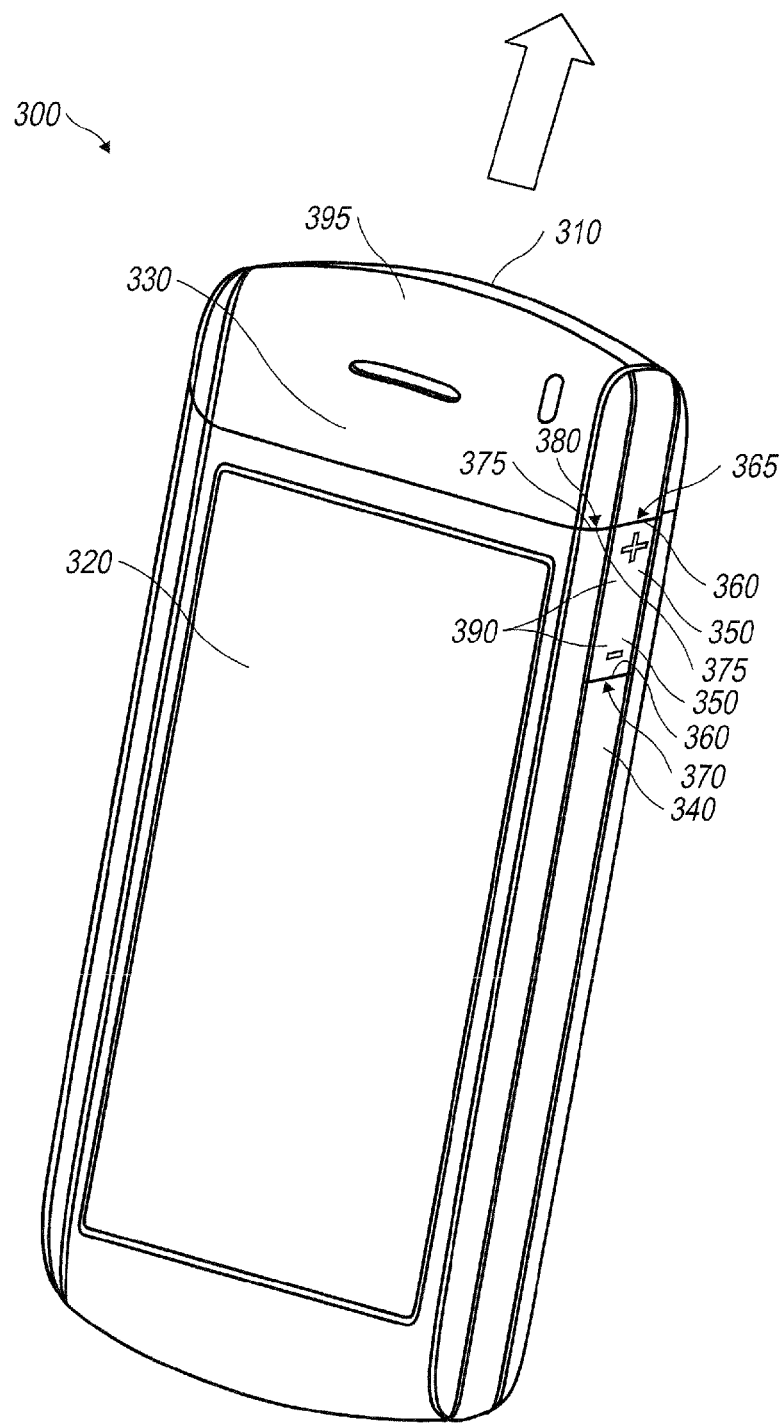
FIG. 3 illustrates yet another example of a portion of a mobile device.

Referring to FIGS. 2 and 3, perspective views of a portion of another mobile device 200 and a portion of yet another mobile device 300 are shown. These mobile devices 200, 300 can have many of the same components described with respect to the mobile device 100 of FIG. 1. Moreover, many of the features and components of the mobile devices 200, 300 can be implemented in the mobile device 100 of FIG. 1. As an example, the mobile device 200 can include a housing 210, a display 220, a front surface 230 and a side surface 240 that can be substantially perpendicular to the front surface 230. Similarly, the mobile device 300 can have a housing 310, a display 320, a front surface 330 and a side surface 340, which can also be substantially perpendicular to the front surface 330.

In one arrangement, the mobile device 200 can have one or more actuators 250, which can be, for example, positioned on the side surface 240 and can be part of the housing 210. Likewise, the mobile device 300 can include one or more actuators 350 positioned on the side surface 340, for example, and the actuators 350 can be part of the housing 310. As an example, the actuators 250, 350 can be depressible buttons that can be used to initiate various corresponding and predetermined responses or actions in their respective mobile devices 200, 300. In a more specific example, although other numbers may be suitable, the actuators 250, 350 of FIGS. 2 and 3 can be a working pair of depressible or flexible buttons in which activation of one or a first actuator 250, 350 can initiate a first predetermined action and activation of the other or second actuator 250, 350 can initiate a second predetermined action that is associated with the predetermined action of the first actuator 250, 350. For example, the working pair of actuators 250, 350 can be a set of volume buttons for adjusting the volume of certain applications in their respective mobile devices 200, 300.

In another arrangement, the actuators 250 of FIG. 2 can include transition points 260, which indicate a move from one surface to another in which the surfaces are non-parallel with one another. Here, the transition points 260 can form a single gap 270. In view of the gap 270, the actuators 250 can move freely when a pressing force is applied to either one. The gap 270 can also be referred to as an actuator gap 270.

The housing 210 can also include one or more transition points 280, which can form part of another gap 285. If desired, the actuators 250 can be positioned such that the transition points 260 of the actuators 250 can be substantially aligned with the transition points 280 of the housing 210. As such, the gap 270 formed between the actuators 250 can be substantially aligned with the gap 285 of the housing 210. As a result, the number of seams in the housing 210 can be reduced without affecting the functionality of the mobile device 200. To further enhance the overall appearance of the mobile device 200 and to also reduce its profile, a top surface 290 of the actuators 250 can be substantially flush with the side surface 240 of the housing 210.

Referring to the mobile device 300, similar to the mobile device 200, the actuators 350 can have transition points 360. In an exemplary arrangement, however, the transition point 360 of the first or upper actuator 350 located closer to the top of the mobile device 300 can be part of a first gap 365, and the transition point 360 of the second or lower actuator 350 can be part of a second gap 370. Both the first gap 365 and the second gap 370 can also be referred to as actuator gaps 365, 370. Additionally, transition points 375 of the housing 310 can form a gap 380 of the housing 310. As an example, the first gap 365 and the gap 380 of the housing 310 can be substantially aligned with one another, and the second gap 370 may not be aligned with the gap 380. Of course, as an alternative, the second gap 370 can also be substantially aligned with the gap 380 of the housing 310, or both the first gap 360 and the second gap 370 can be aligned with one or more other gaps in the housing 310. In either arrangement, the number of discernable lines in the housing 310 can be reduced. A top surface 390 of the actuators 350 can be substantially flush with the side surface 340 of the housing 310, like that shown for the mobile device 200.

As an example, the housing 210 of the mobile device 200 of FIG. 2 can include a movable plate 295, which can move in a direction in accordance with the arrow depicted above the mobile device 200. In view of this configuration, the mobile device 200 can be a slide-style mobile device, and by sliding the movable plate 295 in the direction shown, one or more other physical features (not shown), such as a keypad or display, can be accessed. Similarly, the mobile device 300 can have a movable plate 395 to achieve the same function.

Figure 4:
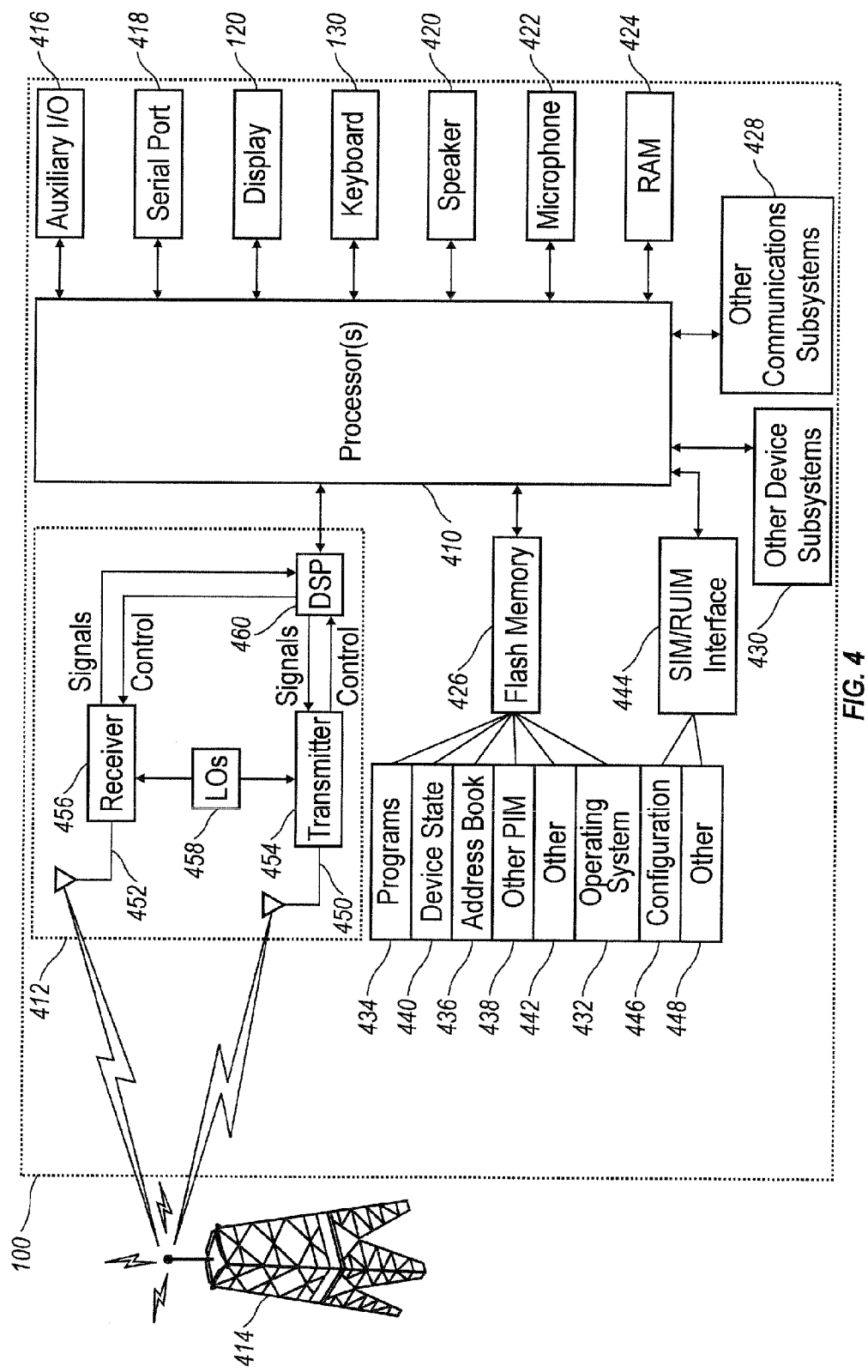
FIG. 4 illustrates an example of a block diagram containing several components that are part of a mobile device.

Referring to FIG. 4, an example of a block diagram of some of the components that make up the mobile device 100 is shown. Although FIG. 4 is described in terms of the mobile device 100, it must be noted that the systems and elements of FIG. 4 can equally apply to the mobile devices 200, 300.

The mobile device 100 can include a processor 410 that can control the operation of the mobile device 100. A communication subsystem 412 can perform all communication transmission and reception with a wireless network 414. The processor 410 can further be coupled to an auxiliary input/output (I/O) subsystem 416, which can be coupled to the mobile device 100. In at least one embodiment, the processor 410 can be coupled to a serial port (for example, a Universal Serial Bus port) 418, which can allow for communication with other devices or systems. The display 120 can be coupled to the processor 410 to allow for displaying of information to an operator of the mobile device 100. When the mobile device 100 is equipped with the keypad 130, the keypad 130 can also be coupled to the processor 410.

The mobile device 100 can include a speaker 420, a microphone 422, random access memory (RAM) 424 and flash memory 426, all of which can be coupled to the processor 410. Other similar components can be provided on the mobile device 100 and optionally coupled to the processor 410. Other communication subsystems 428 and other communication device subsystems 430 are generally indicated as being functionally coupled with the processor 410, as well. An example of a communication subsystem 428 is that of a short range communication system such as a BLUETOOTH® communication module or a WI-FI® communication module (a communication module in compliance with IEEE 802.11 set of protocols) and associated circuits and components.

The processor 410 is able to perform operating system functions and can enable execution of programs on the mobile device 100. In some embodiments, not all of the above components may be included in the mobile device 100. For example, in at least one embodiment, the keypad 130 is not provided as a separate component and is displayed as required on a dynamic touch display. In an embodiment having a dynamic touch display, the keypad 130 can be displayed as a touchscreen keypad. A touchscreen module (not shown) can be incorporated in such an embodiment such that it is in communication with the processor 410. When inputs are received on the touchscreen keypad, the touchscreen module can send or relay messages corresponding to those inputs to the processor 410.

The auxiliary I/O subsystem 416 can take the form of a navigation tool, such as an optical trackpad, a thumbwheel, a mechanical trackball, a joystick, a touch-sensitive interface, or some other I/O interface. Other auxiliary I/O subsystems can include external display devices and externally connected keyboards (not shown). While the above examples have been provided in relation to the auxiliary I/O subsystem 416, other subsystems capable of providing input or receiving output from the mobile device 100 are considered within the scope of this disclosure. Other keys or buttons, such as the actuators 250, 350 can be placed along the side of the mobile device 100 to function as escape keys, volume control keys, scrolling keys, power switches, or user programmable keys, and can likewise be programmed accordingly.

Furthermore, the mobile device 100 can be equipped with components to enable operation of various programs, as shown in FIG. 4. In an exemplary embodiment, the flash memory 426 can be enabled to provide a storage location for an operating system 432, device programs 434 and data. The operating system 432 can generally be configured to manage other programs 434 that are also stored in flash memory 426 and executable on the processor 410. The operating system 432 can honor requests for services made by programs 434 through predefined program 434 interfaces. More specifically, the operating system 432 can typically determine the order in which multiple programs 434 are executed on the processor 410 and the execution time allotted for each program 434, manage the sharing of flash memory 426 among multiple programs 434, handle input and output to and from other device subsystems 430, and so on. In addition, operators can typically interact directly with the operating system 432 through a user interface, which can include the display 120 and the keypad 130. While in an exemplary embodiment, the operating system 432 is stored in flash memory 426, the operating system 432 in other embodiments is stored in read-only memory (ROM) or a similar storage element (not shown). As those skilled in the art will appreciate, the operating system 432, the device program 434 or parts thereof can be loaded in RAM 424 or some other volatile memory.

In one exemplary embodiment, the flash memory 426 can contain programs 434 for execution on the mobile device 100 including an address book 436, a personal information manager (PIM) 438 and the device state 440. Furthermore, programs 434 and other information 442 including data can be segregated upon storage in the flash memory 426 of the mobile device 100.

When the mobile device 100 is enabled for two-way communication within the wireless communication network 414, it can send and receive messages from a mobile communication service. Examples of communication systems enabled for two-way communication can include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX) networks, Long Term Evolution (LTE) networks and other networks that can be used for data and voice, or just data or voice.

For the systems listed above, the mobile device 100 can require a unique identifier to enable the mobile device 100 to transmit and receive messages from the communication network 414. Other systems may not require such identifying information. As an example, GPRS, UMTS, and EDGE use a Subscriber Identity Module (SIM) in order to allow communication with the communication network 414. Likewise, most CDMA systems use a Removable User Identity Module (RUIM) to communicate with the CDMA network. The RUIM and SIM card can be used in multiple different mobile devices 100. The mobile device 100 can be able to operate some features without a SIM/RUIM card. A SIM/RUIM interface 444 located within the mobile device 100 can allow for removal or insertion of a SIM/RUIM card (not shown). The SIM/RUIM card can feature memory and can hold key configurations 446, and other information 448, such as identification and subscriber related information. With a properly enabled mobile device 100, two-way communication between the mobile device 100 and communication network 414 is possible.

The two-way communication enabled mobile device 100 can both transmit and receive information from the communication network 414. The transfer of communication can be from the mobile device 100 or to the mobile device 100. To communicate with the communication network 414, the mobile device 100 in the presently described exemplary embodiment is equipped with an integral or internal antenna 450 for transmitting messages to the communication network 414. Likewise, the mobile device 100 in the presently described exemplary embodiment can be equipped with another antenna 452 for receiving communication from the communication network 414. These antennae (450, 452), in another exemplary embodiment, can be combined into a single antenna (not shown). As one skilled in the art would appreciate, the antenna or antennae (450, 452) in another embodiment can be externally mounted on the mobile device 100. The mobile device 100 can also have a transmitter 454 and a receiver 456, which can be respectively coupled to antennae (450, 452), and can also include one or more local oscillators 458 for processing the incoming or outgoing RF signals. The mobile device 100 can also have a digital signal processor (DSP) 460 to assist in the processing of the incoming and outgoing signals.

Figure 5:
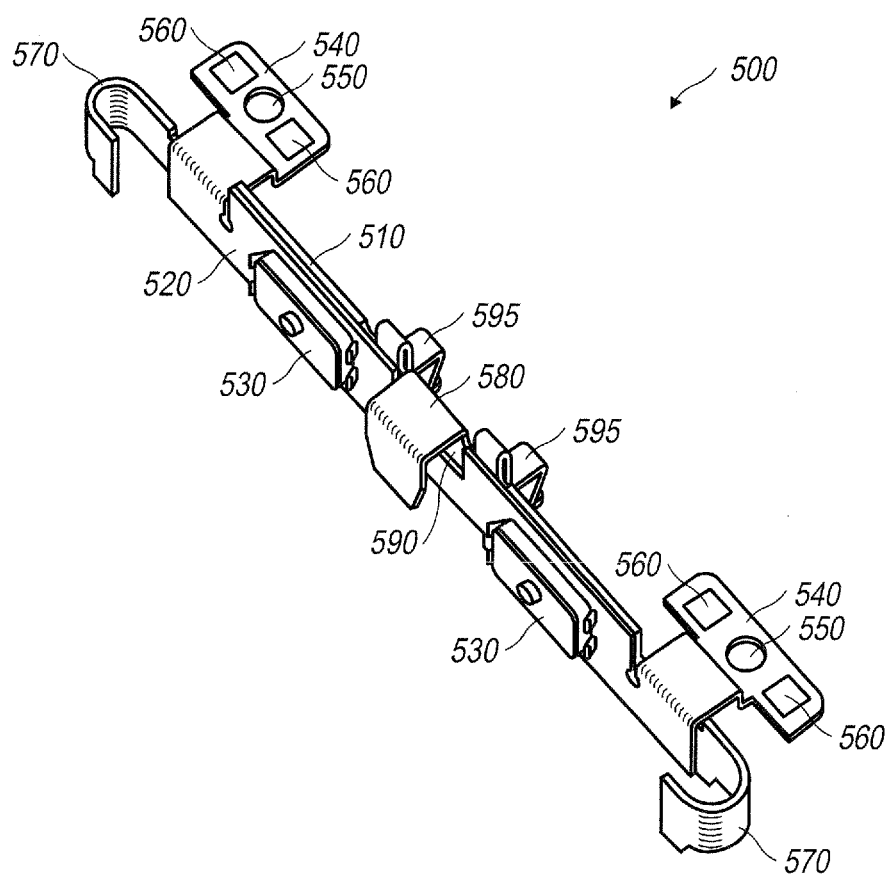
FIG. 5 illustrates an example of a key assembly.
Figure 6:
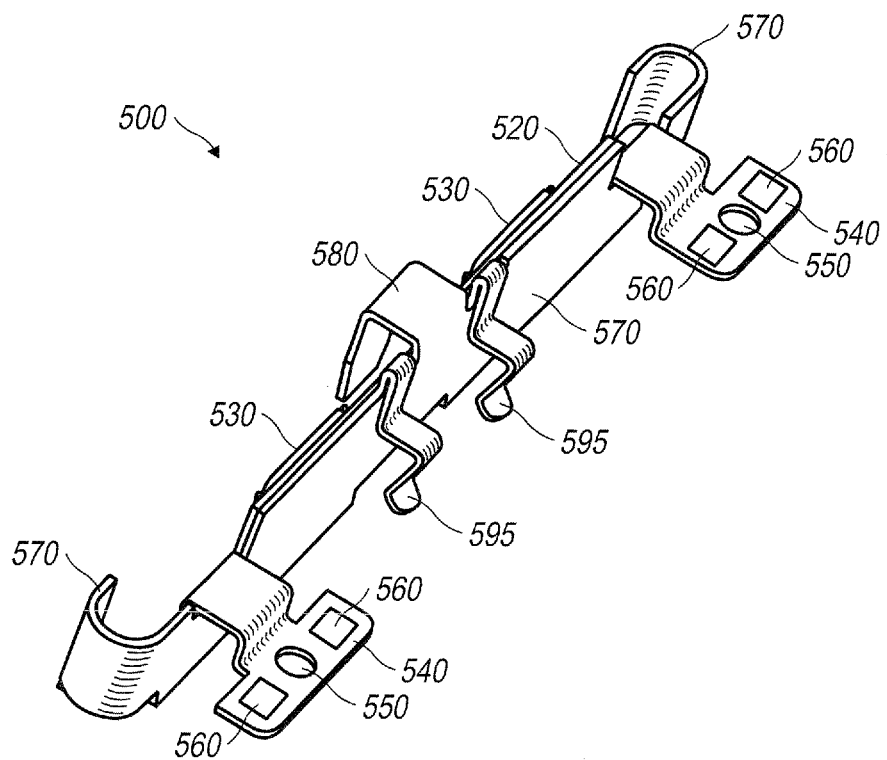
FIG. 6 illustrates another view of the key assembly of FIG. 5.

As described earlier, the mobile devices 200, 300 can include actuators 250, 350 that can perform certain functions and can also have an aesthetically pleasing appearance. To ensure proper operation of the actuators 250, 350 and to meet the visual design goals, several key assemblies incorporating the actuators have been developed. An example of one such key assembly 500 is shown in FIGS. 5 and 6. Here, the assembly 500 can include a stiffening component 510 and a flexible circuit 520 that can be positioned against and coupled to the stiffening component 510. This assembly 500 can be suitable for the mobile device 200 of FIG. 2, although it is understood that the assembly 500 is not limited to any particular device. As will be described below, the stiffening component 510 can be configured to be secured to the housing 210 of FIG. 2, such as by being engaged with or coupled to the actuators 250. Moreover, the flexible circuit 520 can be configured to relay signals in response to a force being applied to the actuators 250. For example, the flexible circuit 520 can include signal traces (not shown) for transmitting signals to relevant components in the mobile device 200.

The flexible circuit 520 can include one or more switches 530, which can be activated when the force is applied to the actuators 250. To assist in the transfer of signals, the flexible circuit 520 can include one or more extensions 540, each of which can define an aperture 550 and one or more electrical connection pads 560. The aperture 550 can be for receiving a heat staking pin (not shown) to help secure the extensions 540 to the housing 210.

The stiffening component 510 can include one or more end portions 570, and the end portions 570 can be substantially curved, although the end portions are not limited to such a curved configuration. The curved end portions 570 can be configured to engage a corresponding tab (not shown here) of the housing 210. To help stabilize the actuators 250, the stiffening component 510 can also include one or more projections 580 that can rise above a surface 590 (shown in FIG. 5) of the stiffening component 510. As an example, the surface 590 can be substantially planar or flat, although other configurations are acceptable. This projection 580 can be configured to engage a corresponding fastening portion (not shown here) of the actuator 250 of the housing 210. One or more clips 595 can also be part of the stiffening component 510 for electrical grounding and mechanical securing to a printed circuit board (not shown here) of the housing 210. As an example, the stiffening component 510 can be made of sheet metal, although other rigid materials may be used.

Figure 7:
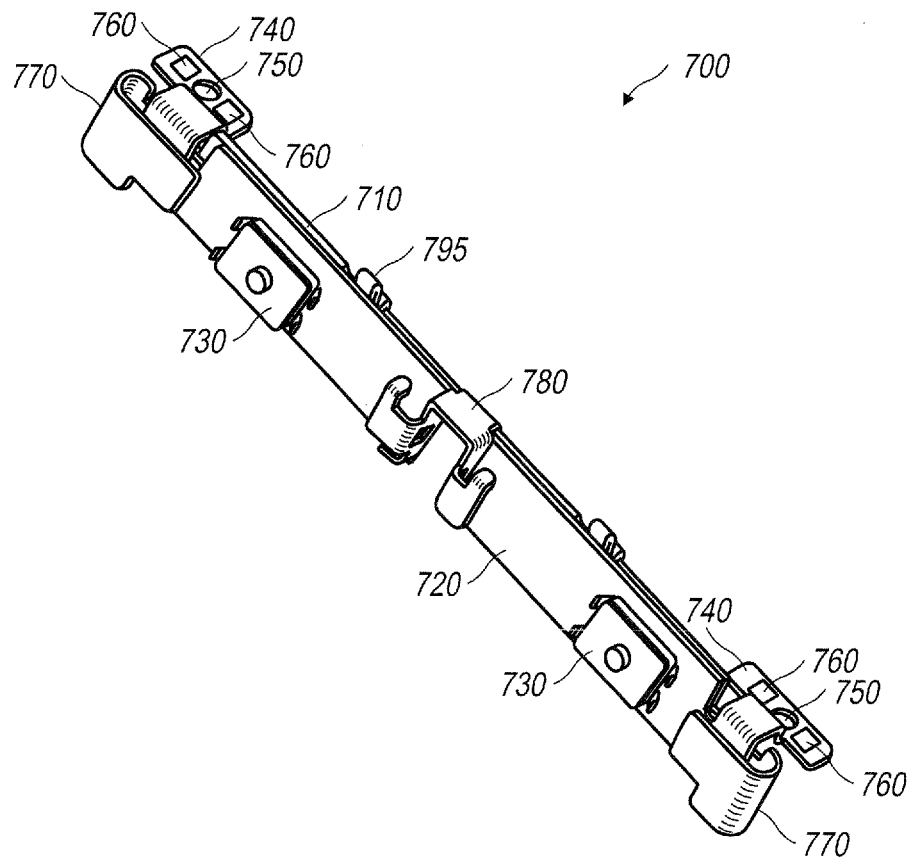
FIG. 7 illustrates another example of a key assembly.
Figure 8:
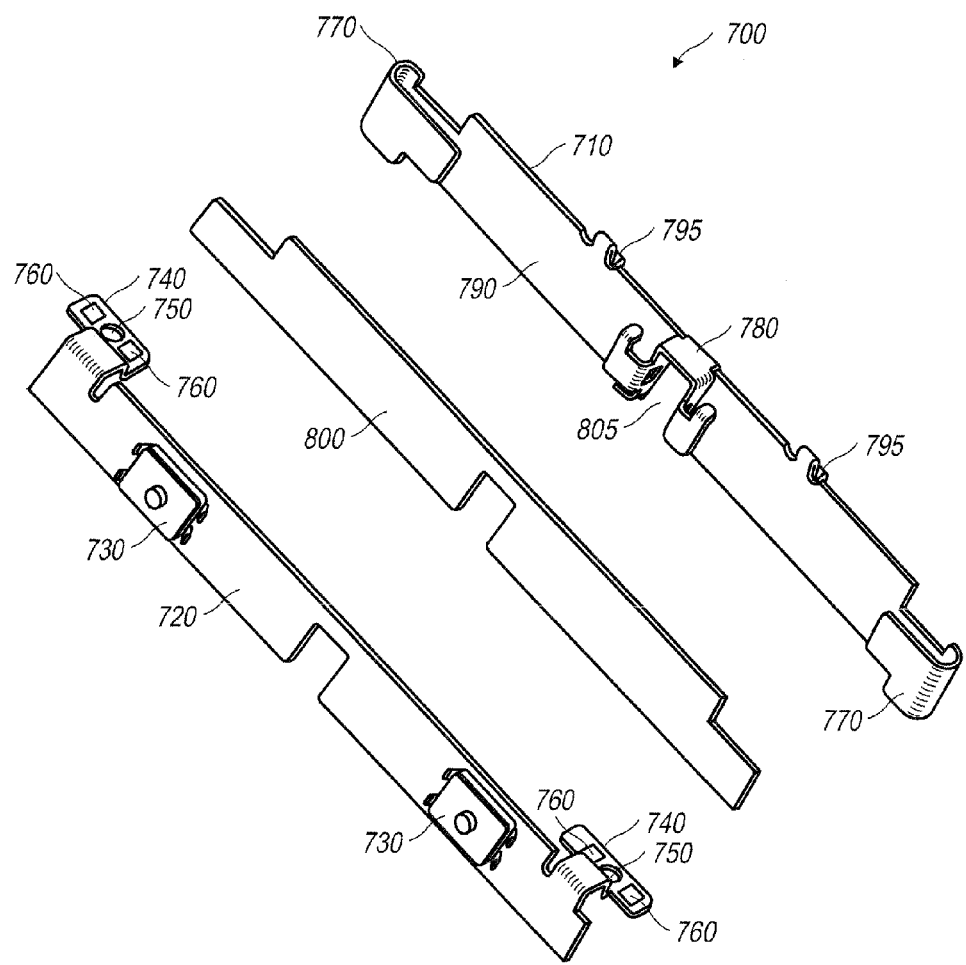
FIG. 8 illustrates an exploded view of the key assembly of FIG. 7.

Referring to FIGS. 7 and 8, an example of a key assembly 700 that can be used with the mobile device 300 of FIG. 3 is shown. Like the assembly 500 of FIG. 5, the assembly 700 can include a stiffening component 710 and a flexible circuit 720 that can contain one or more switches 730 for activation when a force is applied to the actuators 350. The flexible circuit 710 can also include one or more extensions 740, each of which can define one or more apertures 750 and electrical connection pads 760. The stiffening component 710 can also include one or more curved end portions 770 and projections 780. The projection 780 can also rise above a substantially planar surface 790 (see FIG. 8) of the stiffening component 710, although the design of the projection 780 can be slightly different from that of the projection 580 of FIG. 5. An engagement example for both projections 580, 780 will be presented below. One or more clips 795 can also be part of the stiffening component 710.

As best shown in FIG. 8, to help secure the flexible circuit 720 to the stiffening component 710, an electrically conductive adhesive 800 can be applied to, for example, the surface 790 of the stiffening component 710. The adhesive 800 can be used to ground the flexible circuit 720 to the stiffening component 710. This description can also apply to the key assembly 500 of FIGS. 5 and 6, as adhesive 800 can also be placed between the stiffening component 510 and the flexible circuit 520. As also shown here, a gap 805 can exist adjacent to the projection 780 of the stiffening component 710. As will be explained later, this gap 805 can permit a tab (not shown here) to extend through and engage the stiffening component 710. The flexible circuit 720 and the conductive adhesive 800 can also be configured to accommodate the tab.

Figure 9:
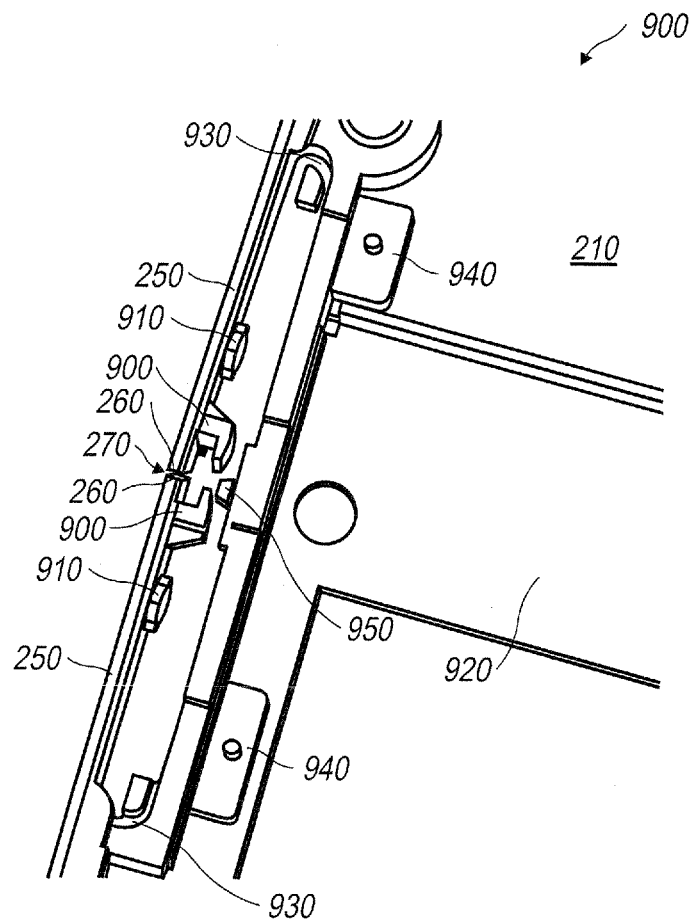
FIG. 9 illustrates an example of a cut-away view of a housing of a mobile device.
Figure 10:
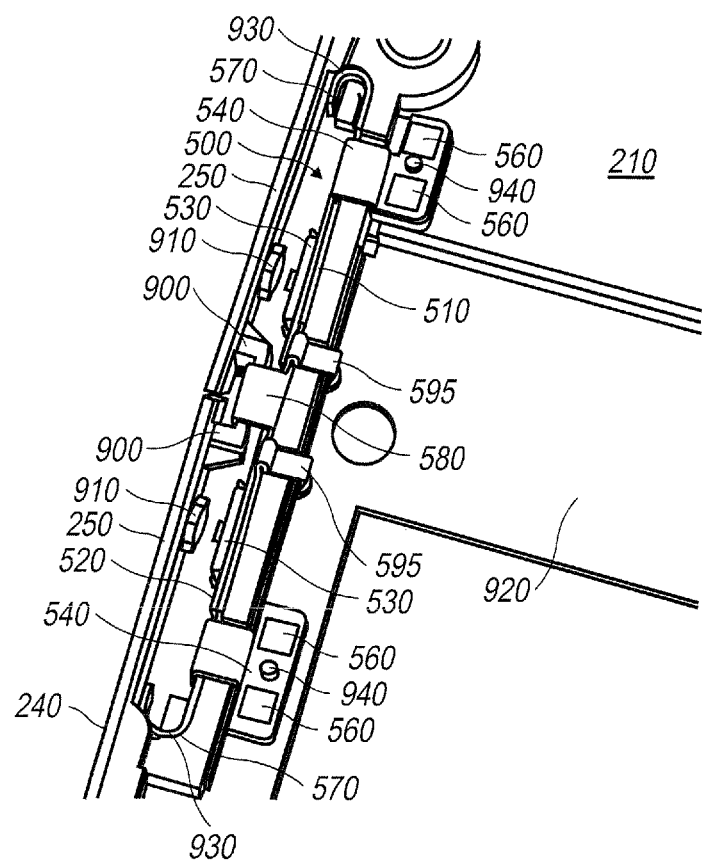
FIG. 10 illustrates the key assembly of FIG. 5 secured to the housing of FIG. 9.

As noted above, the key assembly 500 of FIGS. 5 and 6 can be suitable for the mobile device 200 of FIG. 2. A cut-away illustration of an example of the housing 210 is shown in FIG. 9. Here, the transition points 260 and the gap 270 between the actuators 250 can be seen. The housing 210—and the actuators 250—can be made of plastic, for example. As such, the actuators 250 can be relatively flexible, and the gap 270 can enable the actuators 250 to be moved towards the housing 210 when a force is applied to them. In addition, the movement of one actuator 250 can be independent of that of the other. In one arrangement, both actuators 250 can include a tab 900 that can be used to engage the projection 580, and each actuator 250 can also have a protrusion 910 that can be used to assist in the activation of the switches 530 when the force is applied to the actuators 250 (FIG. 10). As also shown in FIG. 9, the housing 210 can have a metal chassis 920, which can provide grounding for the key assembly 500.

Several components shown in FIG. 9 can also be used to help secure the key assembly 500 to the housing 210. For example, referring to both FIGS. 5 and 9, the housing 210 can define one or more channels 930 that can receive and engage the curved end portions 570. One or more heat staking pins 940, which can be fed through the apertures 550, can also be used to secure the extensions 540 to the housing 210. A cap 950 can also be positioned on the housing 210 that can engage a portion of the stiffening component 510 or the flexible circuit 520 or both for purposes of ensuring that the assembly 500 can remain in its intended position in the housing 210.

Referring to FIG. 10, an example of the key assembly 500 assembled into the housing 210 is shown. As can be seen, the projection 580 can engage the tabs 900 of the actuators 250, and the curved end portions 570 of the stiffening component 510 can fit within the channels 930. Moreover, the heat staking pins 940 can be used to secure the extensions 540—and, hence, the flexible circuit 520—to the housing 210. As can also be seen, the clips 595 can be secured to a portion of the housing 210 and can also provide a grounding path for the stiffening component 510, the flexible circuit 520 and the conductive adhesive 800 (see FIG. 8) to the metal chassis 920.

In view of this engagement, when a force is applied to an actuator 250, the actuator 250 can move towards the housing 210, and the protrusion 910 can contact and activate the switch 530. In response, a signal can be transferred along the flexible circuit 520 to a printed circuit board (not shown here) through the appropriate electrical connection pads 560. Once the force is removed, the actuator 250 can move back away from the housing 210, but the projection 580 can provide a stop to keep the actuators 250 in line with the side surface 240.

This structure can help the actuators 250 remain flush with the side surface 240. Although not shown here, one or more cushioning elements can be positioned between the actuators 250 and the assembly 500 to provide protection against drops or other impacts. An example of a cushioning element that can be used here will be presented below.

As further protection against drops or impacts, the bottom surface of the tabs 900 can be configured to contact the top surface of the flexible circuit 520 if a sufficient force is applied to the actuators 250. This feature will not affect normal operation of the actuators 250, such as the protrusions 910 activating the switches 530; however, by contacting the flexible circuit 520 if an impact force is experienced, the tabs 900 can protect the switches 530 and other components by limiting the amount of movement of the actuators 250 during such an event.

Figure 11:
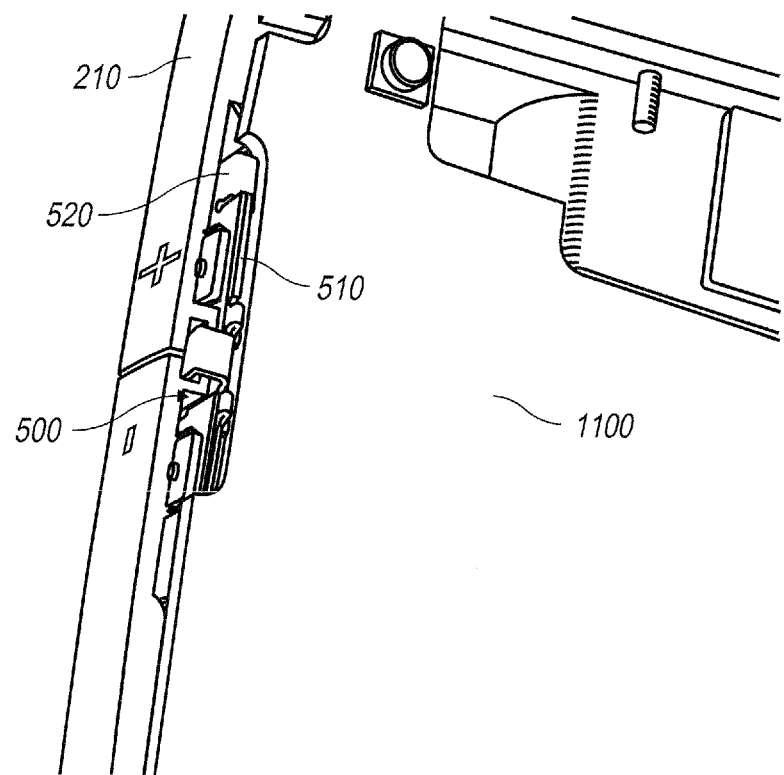
FIG. 11 illustrates the key assembly and housing of FIG. 10 in which an exemplary printed circuit board has been incorporated in the housing.

In addition to the features described above, a printed circuit board (PCB) may also be used to help secure the key assembly 500 to the housing 210. An example of such an embodiment is shown in FIG. 11. One can see how a PCB 1100 can be positioned inside the housing 210 and how the PCB 1100 can assist in securing the stiffening component 510 and the flexible circuit 520 to the housing 210. The PCB 1100 can also have one or more contacts (not shown) that can correspond to the electrical connection pads 560 (see FIG. 5 or 10) of the assembly 500 for transferring signals to or from the assembly 500.

Figure 12:
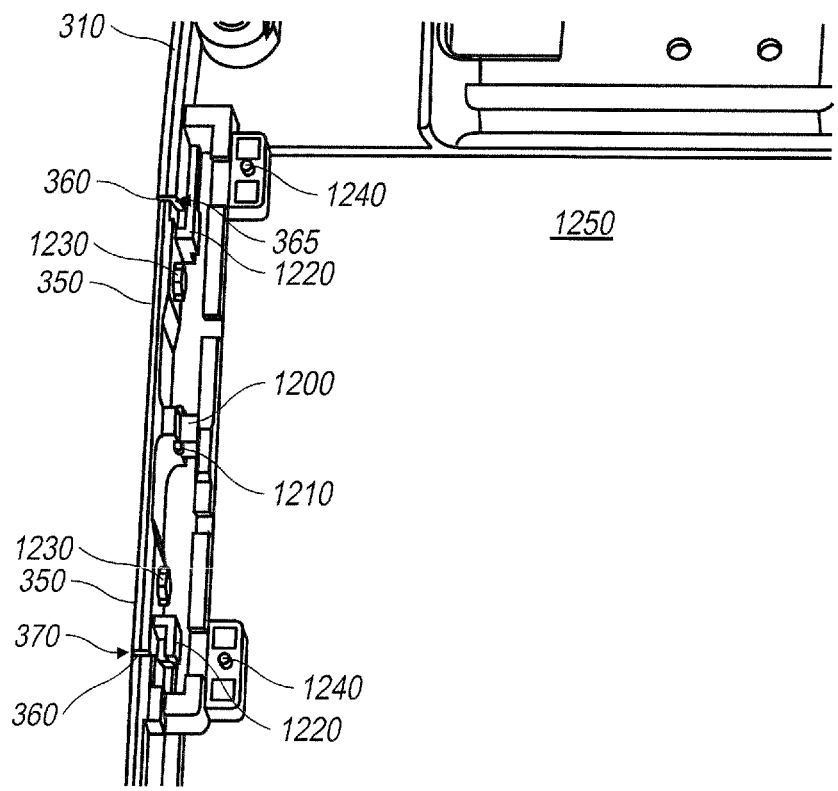
FIG. 12 illustrates an example of a cut-away view of another housing of another mobile device.
Figure 13:
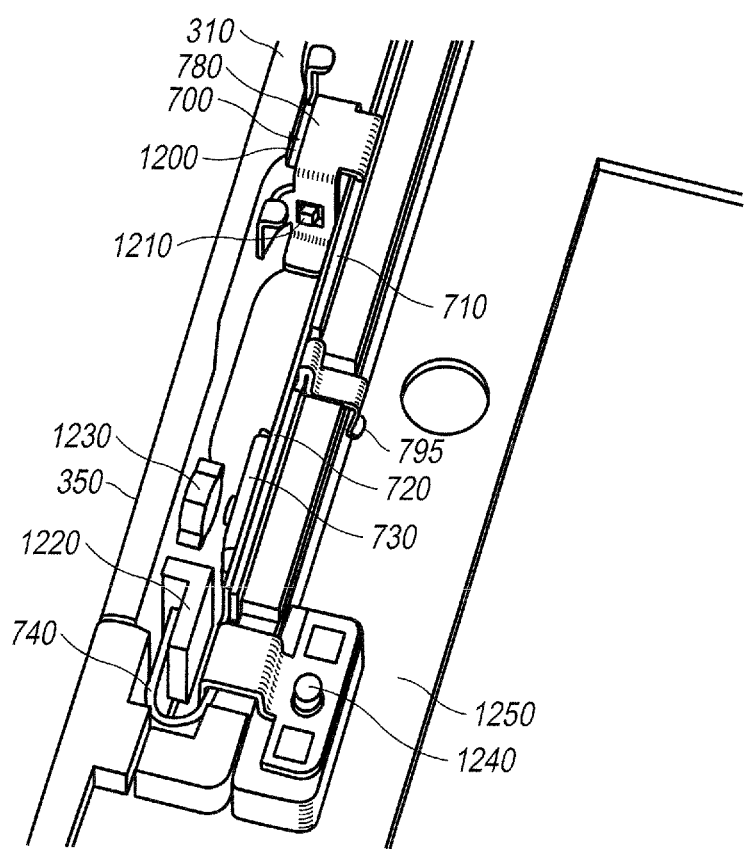
FIG. 13 illustrates the key assembly of FIG. 7 secured to the housing of FIG. 12.

As explained earlier, the key assembly 700 of FIGS. 7 and 8 can be suitable for the mobile device 300 of FIG. 3. A cut-away illustration of an example of the housing 310 is shown in FIG. 12. The transition points 360 of the actuators 350, the first gap 365 and the second gap 370 can be seen in this drawing. The housing 310 can include a tab 1200 for engaging the stiffening component 710. As an example, the tab 1200 can include a snap fit mechanism 1210 that is configured to engage the projection 780 of the stiffening component 710 (FIG. 13). To accommodate its structure, the tab 1200 can extend through the gap 805 (see FIG. 8) of the stiffening component 710 when the key assembly 700 is implemented in the housing 310. As will be explained below, this tab 1200 can also provide support for a pivot point of the actuators 350. As an option, a reinforcing material (not shown), such as metal, can be incorporated into the tab 1200 to provide additional structural integrity to the tab 1200. In another example, both actuators 350 can include an L-shaped component 1220 that can engage the curved end portions 770 of the stiffening component 710 and a protrusion 1230 that can activate the switch 730 (see FIG. 7) when a force is applied to the actuator 350. The housing 310 can also include one or more heat staking pins 1240 for securing the extensions 740 of the flexible circuit 720 and a metal chassis 1250 for grounding purposes.

While the housing 310 of FIG. 12 is fairly similar to the housing 210 of FIG. 9, the operation of the actuators 350 can be different. In particular, when the force is applied to the actuators 350, the pivot point for the actuators 350 can be near the tab 1200, and the majority of the movement of the actuators 350 can occur at the portions containing the L-shaped components 1220.

Referring to FIG. 13, an example of the key assembly 700 installed in the housing 310 is shown. In this example, the projection 780 of the stiffening component 710 can snap fit onto the snap fit mechanism 1210 of the tab 1200. Further, the L-shaped components 1220 of the actuators 350 can engage the curved end portions 740 of the stiffening component 710. The heat staking pins 1240 can also secure the flexible circuit 720 to the housing 310, while the clips 795 can ground the stiffening component 710, the flexible circuit 720 and the conductive adhesive 800 (see FIG. 8) to the metal chassis 1250. As previously explained, when the force is applied to the actuator 350, the actuator 350 can move towards the housing 310, and the protrusion 1230 can activate the switch 730. When the force is removed, the actuator 350 can move away from the housing 310, and the movement of the actuator 350 can be eventually stopped in view of the engagement of the L-shaped component 1220 with the curved end portion 740. To protect against drops or other significant impacts, the bottom surface of the L-shaped component 1220 can contact the top surface of the flexible circuit 720, thereby limiting the movement of the actuator 350 in the event such a force is experienced.

Figure 14:
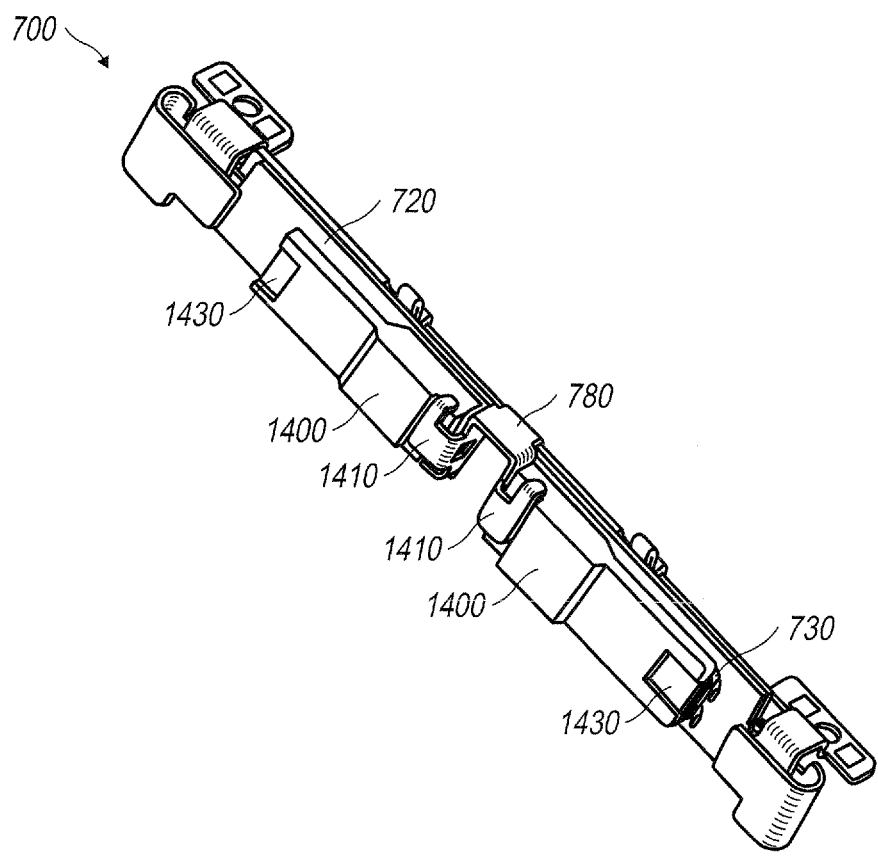
FIG. 14 illustrates an example of a key assembly with cushioning elements.

Referring to FIG. 14, an example of a cushioning element 1400 is shown in which the cushioning element 1400 is part of the key assembly 700. As an example, the cushioning element 1400 can be made of rubber, a soft plastic or any other material that can provide drop protection for the assembly 700. In one arrangement, the projection 780 can include one or more engagement structures 1410 that can engage the cushioning elements 1400 to help secure the cushioning elements 1400 to the assembly 700. As another option, an adhesive (not shown) can be applied to the flexible surface 720 to keep the cushioning element 1400 in its intended position. Each cushioning element 1400 can also define a slot 1430 that can be configured to receive the protrusions 1230 of the actuators 350 (see FIG. 12). In another arrangement, the other side of the cushioning element 1400 can be substantially planar and can contact or be positioned proximate to the switch 730. In this embodiment, the planar surface of the cushioning element 1400 can actually be the surface that is used to contact the switch 730 when the protrusion 1230 of the actuator 350 is used to activate the switch 730.

Figure 15:
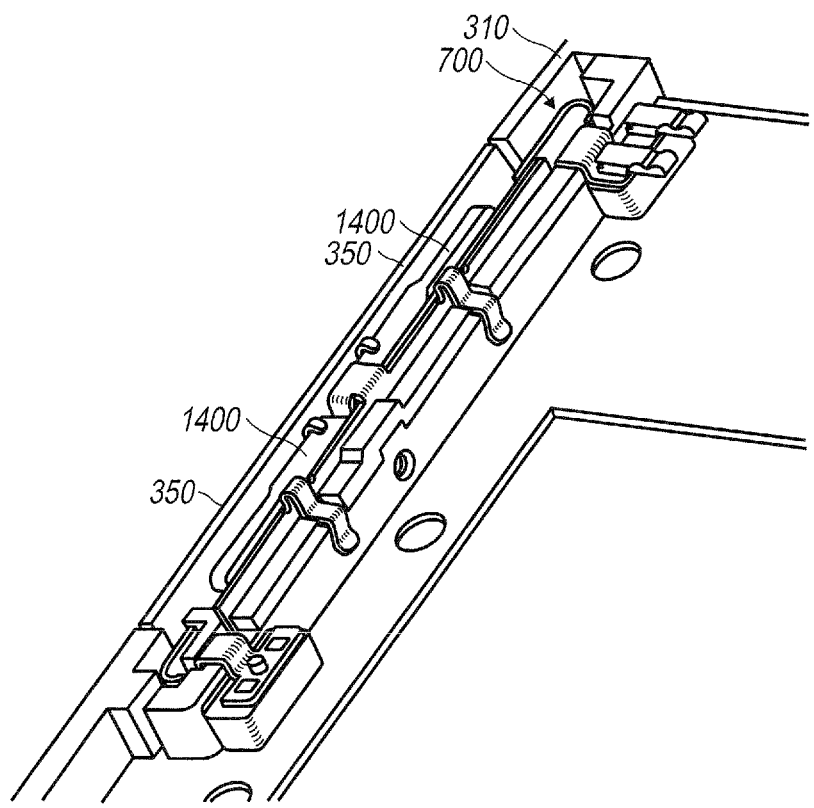
FIG. 15 illustrates an example of the key assembly with cushioning elements of FIG. 14 incorporated into a housing of a mobile device.
Figure 16:
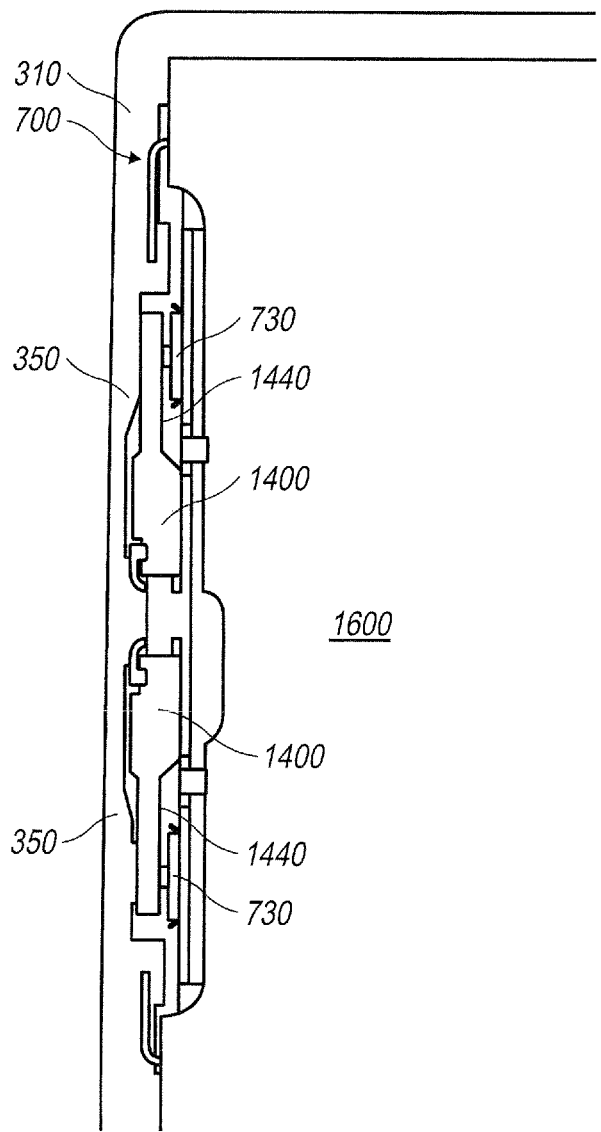
FIG. 16 illustrates the key assembly and the housing of FIG. 15 in which an exemplary printed circuit board has been incorporated in the housing.

Referring to FIGS. 15 and 16, examples of the key assembly 700 having the cushioning elements 1400 implemented in the housing 310 are shown. As can be seen, the cushioning elements 1400 can be positioned between the actuators 350 and the flexible circuit 720, including the switches 730. It can also be seen how a bottom surface 1440 of the cushioning element 1400 can be used to contact the switch 730 (best shown in FIG. 16). In view of this exemplary configuration, the cushioning element 1400 can provide additional protection against impacts for the key assembly 700. A PCB 1600, as shown in FIG. 16, can also be used to help secure the key assembly 700 to the housing 310.

Figure 17:
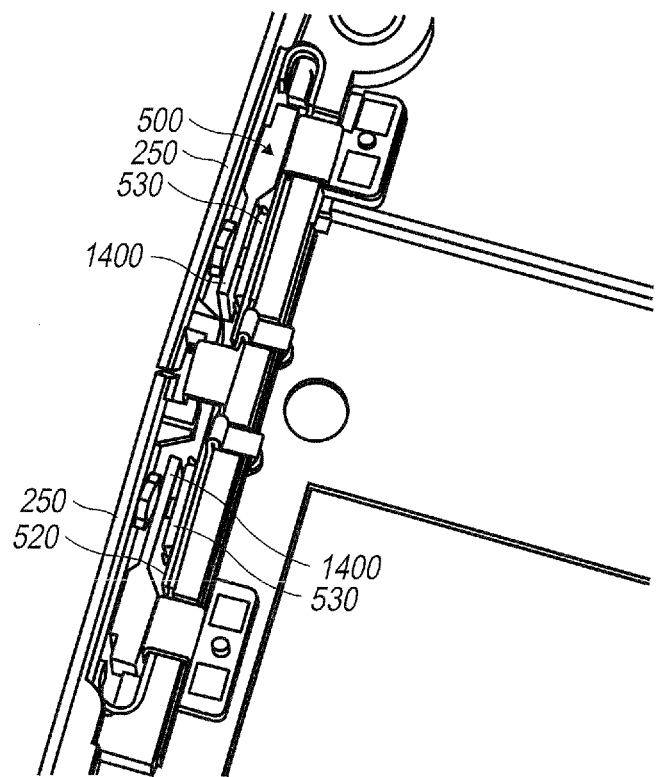
FIG. 17 illustrates an example of another key assembly with cushioning elements incorporated in another housing.

The cushioning element 1400 can also be incorporated in the key assembly 500 of FIG. 5. An example of such a configuration is shown in FIG. 17. There, the cushioning element 1400 can be positioned between the actuator 250 and the flexible circuit 520 (including the switches 530). To secure the cushioning element 1400 to the assembly 500, an adhesive (not shown) can be applied to the flexible circuit 520.

Figure 18:
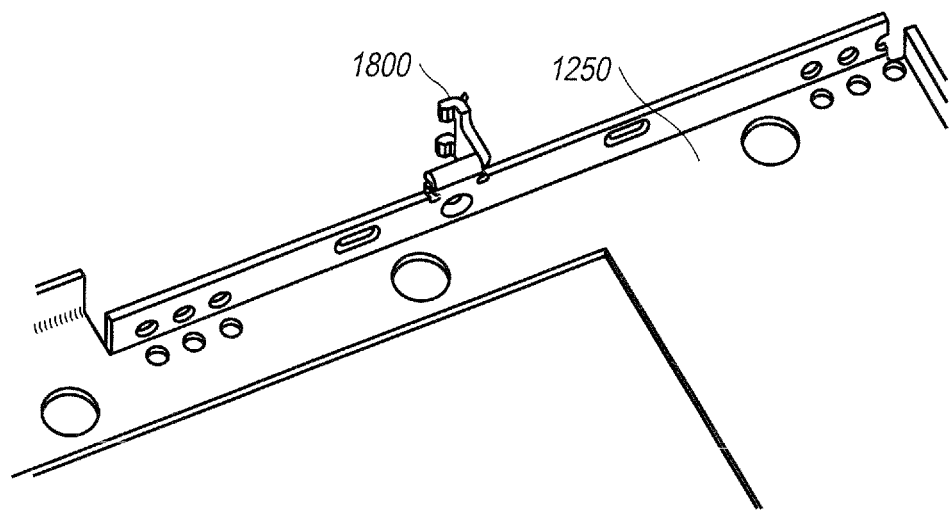
FIG. 18 illustrates an example of a support bracket of a metal chassis.
Figure 19:
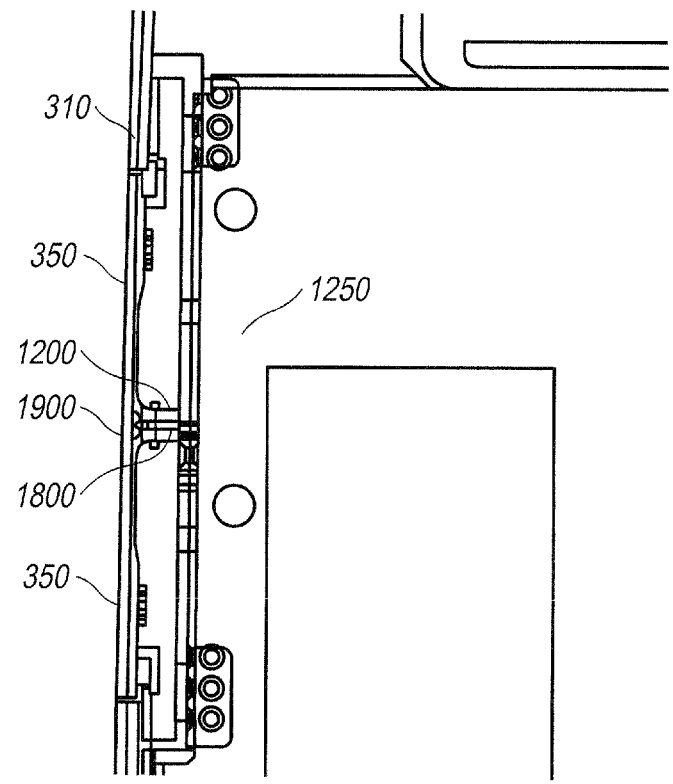
FIG. 19 illustrates the support bracket and the metal chassis of FIG. 18 implemented into a housing.

A previously explained, the tab 1200 of FIG. 12 can provide support to a pivot point of the actuators 350 of the assembly 700. Referring to FIG. 18, an example of a support bracket 1800 that can be part of the metal chassis 1250 is shown. The metal chassis 1250 is also illustrated in FIGS. 12 and 13. The support bracket 1800 can be implemented into the tab 1200 of FIG. 12, for example, and can be useful when combined with the key assembly 700 of FIGS. 7 and 8. Referring to FIG. 19, an example of the metal chassis 1250 assembled to the housing 310 is shown. To describe this configuration, reference will be made to FIGS. 18 and 19.

The actuators 350 of the housing 310 can have a pivot point 1900 (see FIG. 19) just above the tab 1200 in view of the design of the housing 310. The tab 1200 can provide support to this pivot point 1900. Further, the support bracket 1800 can provide additional support for the tab 1200 and, hence, the pivot point 1900. As such, the pivot point 1900 can receive support from the metal chassis 1250 for proper operation of the actuators 350. As an example, the support bracket 1800 can be molded with the tab 1200 of the housing 310, such as through an insert molding process.

The key assemblies 500, 700 described above can permit movement of the actuators 250, 350, thereby enabling initiation of corresponding actions on the mobile devices 200, 300. The design of these assemblies 500, 700 can also allow for gaps 270, 365, 370 of the actuators 250, 350—comprised of transition points 260, 360 where the actuators 250, 350 end—to be substantially aligned with gaps 280, 380 that are present in the housings 210, 310. These configurations can improve the overall appearance of the mobile devices 200, 300 without affecting their functionality. The assemblies 500, 700 can also provide drop or impact protection.

Portions of the mobile device 100, 200 and 300 and supporting components can take the form of hardware elements, software elements or elements containing both hardware and software. In one embodiment, the software portions can include, but are not limited to, firmware, resident software, microcode, etc. Furthermore, these software portions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspects of the system can be centralized or distributed (or a combination thereof) as known to those skilled in the art.

A data processing system suitable for storing program code and for executing program code, which can be implemented in any of the above-referenced devices described herein, can include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. I/O devices (including but not limited to keyboards, displays, pointing devices, etc.) can be coupled to the system either directly or through intervening I/O controllers.

Examples have been described above regarding key assemblies. Various modifications to and departures from the disclosed embodiments will occur to those having skill in the art. The subject matter that is intended to be within the spirit of this disclosure is set forth in the following claims.

What is claimed is:

1. A mobile device, comprising:
a housing including a transition point;
an actuator including a transition point and being configured to initiate a predetermined action;
a stiffening component configured to engage the actuator; and
a flexible circuit coupled to the stiffening component and configured to relay signals in response to a force being applied to the actuator;
wherein the actuator is positioned such that the transition point of the actuator substantially aligns with the transition point of the housing and wherein the housing further includes a metal chassis and the stiffening component is grounded to the metal chassis.

2. A key assembly comprising:
a stiffening component that is physically discrete of a housing and that is configured to be secured to the housing by at least being coupled to an actuator of the housing, the stiffening component including at least one end portion configured to engage a corresponding tab of the housing;
a flexible circuit including a switch and configured to be positioned against the stiffening component, wherein the switch is activated when a force is applied to the actuator;
wherein the key assembly is positioned in the housing in a manner that permits the switch to be activated by the actuator and permits a transition point of the actuator to be substantially aligned with a transition point of the housing.

3. A key assembly, comprising:
a stiffening component that is physically discrete of a housing and that is configured to be secured to the housing by at least being coupled to an actuator of the housing;
a flexible circuit including a switch and configured to be positioned against the stiffening component and secured thereto by a conductive adhesive, wherein the switch is activated when a force is applied to the actuator;
wherein the key assembly is positioned in the housing in a manner that permits the switch to be activated by the actuator and permits a transition point of the actuator to be substantially aligned with a transition point of the housing.

4. The key assembly according to claim 3, wherein the stiffening component has a substantially planar surface for receiving the conductive adhesive and the flexible circuit.

5. The key assembly according to claim 3, wherein the stiffening component includes a projection that rises above a surface of the stiffening component and is configured to engage a corresponding portion of the actuator.

6. The key assembly according to claim 3, further comprising a cushioning element positioned over the switch and providing drop protection to the key assembly, wherein the cushioning element includes a surface that contacts the switch.

7. The key assembly according to claim 6, wherein the stiffening component includes a projection that rises above a surface of the stiffening component and is configured to engage the cushioning element.

8. A mobile device, comprising:
a housing including a transition point;
an actuator including a transition point and being configured to initiate a predetermined action;
a stiffening component configured to engage the actuator; and a flexible circuit coupled to the stiffening component and configured to relay signals in response to a force being applied to the actuator;

a switch coupled to the flexible circuit, the actuator including a protrusion that activates the switch when the force is applied to the actuator;

a cushioning element positioned between the actuator and the flexible circuit, wherein the cushioning element defines a slot that receives the protrusion;

wherein the actuator is positioned such that the transition point of the actuator substantially aligns with the transition point of the housing.

9. The mobile device according to claim 8, wherein the actuator has a top surface that is substantially flush with a surface of the housing, the actuator being part of the housing.

10. The mobile device according to claim 8, wherein the stiffening component is made of sheet metal.

11. The mobile device according to claim 8, wherein the actuator comprises a first actuator and a second actuator, the second actuator configured to initiate a second predetermined action that is associated with a predetermined action of the first actuator.

12. The mobile device according to claim 11, wherein the second actuator includes a transition point and is positioned such that the transition point of the second actuator substantially aligns with the transition point of the housing.

13. The mobile device according to claim 11, wherein the transition point of the first actuator and the transition point of the second actuator define a gap, the transition point of the housing defines part of a gap of the housing, and the gap of the first and second actuators is substantially aligned with the gap of the housing.

14. The mobile device according to claim 11, wherein the transition point of the first actuator defines part of a first gap and the transition point of the housing defines part of a gap of the housing, the first gap and the gap of the housing being substantially aligned with one another, wherein the transition point of the second actuator defines part of a second gap that is substantially misaligned with the gap of the housing.

* * * * *